UNITED STATES PATENT OFFICE.

WALTER S. ROCKEY AND HILLIARY ELDRIDGE, OF NEW YORK, N. Y., ASSIGNORS TO METALLURGICAL RESEARCH COMPANY, A CORPORATION OF ARIZONA TERRITORY.

MANUFACTURING AND REFINING COPPER ALLOYS.

1,017,629.   Specification of Letters Patent.   Patented Feb. 13, 1912.

No Drawing.   Application filed January 28, 1911.   Serial No. 605,281.

*To all whom it may concern:*

Be it known that we, WALTER S. ROCKEY and HILLIARY ELDRIDGE, citizens of the United States, both residing at New York, in the county of New York and State of New York, have invented certain new and useful Improvements in the Process of Manufacturing and Refining Copper Alloys, of which the following is a full, clear, and exact specification.

Our invention relates to the art of manufacturing and refining copper alloys.

The object of our invention is to decrease the cost of manufacturing copper alloys and to manufacture copper alloys having a higher degree of purity than those heretofore manufactured.

In carrying out our process of manufacturing and refining copper alloys, we use a flux of boron trioxid or one containing boron trioxid, or any other suitable or equivalent flux which would have the property of dissolving and holding in suspension the oxids, carbonates and other metallic impurities of the metals, beneath the surface of such flux, we protect the alloying metal used in making the alloy of copper, and after melting the alloy beneath the surface of the molten flux, we add the molten copper to the alloying metal, when at a temperature of just above its melting point preferably between 1,100° and 1,150° cent., by pouring it from the receptacle in which it is melted, preferably through the flux beneath the same where it joins the alloy metal and mixes therewith to form the desired copper alloy. The reason for melting the copper before protecting it beneath the surface of the flux is that when it is melted beneath the flux such a high degree of heat has to be used that it volatilizes and carries or distils off a portion of the flux when the copper is melted beneath the surface of same, thereby causing a loss of the flux, and making it necessary to condense the same to prevent said loss. Another reason is that to make economically a copper alloy, two temperatures are required. It is obvious that the temperature beneath the flux is lower than the temperature in the heat zone, therefore, we fuse the alloying metal beneath the flux because it fuses at a lower temperature and is more volatile than the copper.

The copper while fusing may flow beneath the surface of the flux through a separate conduit instead of being passed through the flux, but we prefer to have it flow directly into and through said flux.

While the copper is being fused in the flame out of the flux, carbon or its equivalent is added to the fusing copper, said carbon or its equivalent serving to materially assist in the reduction of the oxids that may be contained or formed during said fusing operation. The fused copper then flows into and beneath the flux and is further refined by the flux dissolving or holding in suspension the remaining oxids, and other metallic impurities which are reduced in said flux by the further addition of more carbon or its equivalent, it being understood that the alloy which is now formed is maintained at the required temperature until the gases and impurities contained by the metals which form the alloy are expelled therefrom into the flux and are therein reduced by carbon or its equivalent.

It is obvious that any of the alloys such as tin, zinc, manganese, etc., may be used in carrying out our process.

Having thus described our invention what we claim is:

1. The process of refining and manufacturing copper alloy consisting in first reducing to a fluid condition by heat a flux containing boron trioxid, then fusing the alloying metal under the flux and then reducing the copper by heat to a fluid condition and protecting the same from oxidation by carbon and then flowing said copper into said flux thus joining the alloying metal to form the copper alloy and protecting same beneath the surface thereof while maintaining the heat thereon to expel the gases and impurities therefrom into said flux.

2. The process of refining and manufacturing copper alloy consisting in first reducing a flux containing boron trioxid to a fluid condition by heat, then melting the alloying metal beneath the surface of said flux, then flowing the molten copper through said flux thus joining the alloying metal to form the copper alloy and protecting same beneath the surface thereof while maintaining the heat until the metal alloy is formed and the gases and impurities have been expelled therefrom.

3. The process of refining and manufacturing copper alloy consisting in first reducing a flux containing boron trioxid to a fluid condition by heat, then melting zinc beneath the surface of said flux, then pouring the molten copper through said flux thus joining the zinc and forming the copper alloy and protecting same beneath the surface thereof while maintaining the heat until the metal alloy is formed and the gases and impurities have been expelled therefrom.

4. The process of refining and manufacturing copper alloy consisting in first reducing to a fluid condition by heat a suitable flux, then fusing the alloying metal under the flux and then reducing copper by heat to a fluid condition and protecting same from oxidation by carbon and then flowing said copper beneath said flux and protecting said copper beneath the surface thereof while maintaining the heat thereon to expel the gases and impurities therefrom into said flux.

5. The process of refining copper and manufacturing copper alloy consisting in first reducing a flux containing boron trioxid to a fluid condition by heat, then melting the alloying metal beneath the surface of said flux, and then flowing the molten copper beneath the said flux and protecting said copper beneath the surface thereof while maintaining the heat until the metal alloy is formed and the gases and impurities have been expelled therefrom.

6. The process of refining copper and manufacturing copper alloy consisting in first reducing a flux containing boron trioxid to a fluid condition by heat, then melting zinc beneath the surface of said flux, and then flowing the molten copper beneath said flux and protecting said copper alloy beneath the surface thereof while maintaining the heat until the gases and impurities have been expelled therefrom.

7. The process of refining and manufacturing copper alloy consisting in first reducing to a fluid condition by heat a flux containing boron trioxid, then fusing the alloying metal under the flux and then reducing the copper by heat to a fluid condition and protecting the same from oxidation by carbon and then flowing said copper through said flux and into said alloying metal to form the copper alloy and protecting same beneath the surface thereof while maintaining the heat thereon to expel the gases and impurities therefrom into said flux, then adding carbon to the flux to further reduce the metallic impurities.

8. The process of refining and manufacturing copper alloy consisting in first reducing a flux containing boron trioxid to a fluid condition by heat, then melting the alloying metal beneath the surface of said flux, then flowing the molten copper through said flux thus joining the alloying metal to form the copper alloy and protecting same beneath the surface thereof while maintaining the heat until the metal alloy is formed and the gases and impurities have been expelled therefrom, and then adding carbon to the flux to further reduce the metallic impurities.

9. The process of refining and manufacturing copper alloy consisting in first reducing a flux containing boron trioxid to a fluid condition by heat, then melting zinc beneath the surface of said flux, then pouring the molten copper through said flux thus joining the zinc and forming the copper alloy and protecting same beneath the surface thereof while maintaining the heat until the metal alloy is formed and the gases and impurities have been expelled therefrom, and then adding carbon to the flux to further reduce the metallic impurities.

10. The process of refining and manufacturing copper alloy consisting in first reducing to a fluid condition by heat a suitable flux, then fusing the alloying metal under the flux and then reducing copper by heat to a fluid condition and protecting same from oxidation by carbon and then flowing said copper beneath said flux and said carbon into said flux and protecting said copper beneath the surface thereof while maintaining the heat thereon to expel the gases and impurities therefrom into said flux, and then adding more carbon to the flux to further reduce the metallic impurities.

11. The process of refining copper and manufacturing copper alloy consisting in first reducing a flux containing boron trioxid to a fluid condition by heat, then melting the alloying metal beneath the surface of said flux, then flowing the molten copper beneath the surface of said flux and protecting said copper beneath the surface thereof while maintaining the heat until the metal alloy is formed and the gases and impurities have been expelled therefrom, and then adding carbon to the flux to further reduce the metallic impurities.

12. The process of refining copper and manufacturing copper alloy consisting in first reducing a flux containing boron trioxid to a fluid condition by heat, then melting zinc beneath the surface of said flux, then flowing the molten copper beneath the said flux and protecting said copper alloy beneath the surface thereof while maintaining the heat until the gases and impurities have been expelled therefrom, and then adding carbon to the flux to further reduce the metallic impurities.

13. The process of refining and manufacturing copper alloy consisting in first reducing to a fluid condition by heat a flux containing boron trioxid, then fusing the alloying metal under the flux and then reducing the copper by heat to a fluid condition and protecting the same from oxidation by a suitable covering and then flowing said copper into said flux thus joining the alloying metal to form the copper alloy and protecting same beneath the surface thereof while maintaining the heat thereon to expel the gases and impurities therefrom into said flux.

14. The process of refining and manufacturing copper alloy consisting in first reducing to a fluid condition by heat a flux containing boron trioxid, then fusing the alloying metal under the flux and then reducing the copper by heat to a fluid condition and protecting the same from oxidation by carbon and then flowing said copper through said flux and into said alloying metal to form the copper alloy and protecting same beneath the surface thereof while maintaining the heat thereon to expel the gases and impurities therefrom into said flux, and then adding a suitable reducing agent to the flux to further reduce the metallic impurities.

15. The process of refining and manufacturing copper alloy consisting in first reducing to a fluid condition by heat a flux containing boron trioxid, then fusing the alloying metal under the flux and then reducing the copper by heat to a fluid condition and protecting the same from oxidation by covering it with a substance containing a suitable reducing agent and then flowing said copper through said flux and into said alloying metal to form the copper alloy and protecting same beneath the surface thereof while maintaining the heat thereon to expel the gases and impurities therefrom into said flux, and then adding a suitable reducing agent to the flux to further reduce the metallic impurities.

16. The process of refining and manufacturing copper alloy consisting in first reducing a flux containing boron trioxid to a fluid condition by heat, then melting the alloying metal beneath the surface of said flux, then flowing the molten copper through said flux thus joining the alloying metal to form the copper alloy and protecting same beneath the surface thereof while maintaining the heat until the metal alloy is formed and the gases and impurities have been expelled therefrom, and then adding a suitable reducing agent to the flux to further reduce the metallic impurities.

17. The process of refining and manufacturing copper alloy consisting in first reducing a flux containing boron trioxid to a fluid condition by heat, then melting zinc beneath the surface of said flux, then pouring the molten copper through said flux thus joining the zinc and forming the copper alloy and protecting same beneath the surface thereof while maintaining the heat until the metal alloy is formed and the gases and impurities have been expelled therefrom, and then adding a suitable reducing agent to the flux to further reduce the metallic impurities.

18. The process of refining copper and manufacturing copper alloy consisting in first reducing a flux containing boron trioxid to a fluid condition by heat, then melting the alloying metal beneath the surface of said flux, then flowing the molten copper beneath the surface of said flux and protecting said copper beneath the surface thereof while maintaining the heat until the metal alloy is formed and the gases and impurities have been expelled therefrom, and then adding a suitable reducing agent to the flux to further reduce the metallic impurities.

19. The process of making copper alloy consisting in first reducing a suitable flux to a fluid condition by heat, then melting the alloying metal beneath said flux, then melting copper and flowing same beneath said flux and into said alloying metal and protecting same beneath the surface of the flux while maintaining the heat until the alloy is formed and the gases and impurities have been expelled therefrom.

20. The process of making copper alloy consisting in first reducing a suitable flux to a fluid condition by heat, then melting the alloying metal beneath said flux, then melting copper and flowing same beneath said flux into said alloying metal and heating same until the oxids have been expelled from the alloy into said flux, then adding a suitable reducing agent to said flux to reduce the oxids contained therein.

21. The process of making copper alloy consisting in first reducing a suitable flux to a fluid condition by heat, then melting the alloying metal beneath said flux, then melting copper and flowing same through and beneath said flux into said alloying metal and heating same until the oxids have been expelled from the alloy into said flux, then adding a suitable reducing agent to said flux to reduce the oxids contained therein.

In testimony whereof, we affix our signatures, in presence of two witnesses.

WALTER S. ROCKEY.
HILLIARY ELDRIDGE.

Witnesses:
G. F. QUACKINBUSH,
JOSEPH MATTES.